(12) United States Patent
Riley et al.

(10) Patent No.: US 11,507,675 B2
(45) Date of Patent: *Nov. 22, 2022

(54) SYSTEM, METHOD, AND APPARATUS FOR ENHANCED WHITELISTING

(71) Applicant: PC Matic, Inc., Sioux City, IA (US)

(72) Inventors: Matthew Quincy Riley, Owosso, MI (US); Robert J. Cheng, Myrtle Beach, SC (US); Robert J. Woodworth, Jr., Charleston, SC (US); Andrew Tuch, Boca Raton, FL (US)

(73) Assignee: PC MATIC, INC., Sioux City, IA (US)

( * ) Notice: Subject to any disclaimer, the term of this patent is extended or adjusted under 35 U.S.C. 154(b) by 185 days.

This patent is subject to a terminal disclaimer.

(21) Appl. No.: 17/134,716

(22) Filed: Dec. 28, 2020

(65) Prior Publication Data
US 2022/0083672 A1   Mar. 17, 2022

Related U.S. Application Data

(63) Continuation-in-part of application No. 17/018,427, filed on Sep. 11, 2020, now Pat. No. 11,275,828.

(51) Int. Cl.
*G06F 21/00*   (2013.01)
*G06F 21/60*   (2013.01)
*G06F 21/51*   (2013.01)
*H04L 9/32*    (2006.01)

(52) U.S. Cl.
CPC ........... *G06F 21/604* (2013.01); *G06F 21/51* (2013.01); *H04L 9/3236* (2013.01); *H04L 9/3247* (2013.01); *G06F 2221/033* (2013.01)

(58) Field of Classification Search
None
See application file for complete search history.

(56) References Cited

U.S. PATENT DOCUMENTS

| 9,117,075 B1* | 8/2015 | Yeh | G06F 21/567 |
| 2012/0030731 A1* | 2/2012 | Bhargava | H04L 63/10 726/3 |
| 2013/0097659 A1* | 4/2013 | Das | G06F 21/51 726/1 |

(Continued)

OTHER PUBLICATIONS

Turaev, Hasan et al. Prevention of Ransomware Execution in Enterprise Environment on Windows OS: Assessment of Application Whitelisting Solutions. 2018 1st International Conference on Data Intelligence and Security (ICDIS). https://ieeexplore.ieee.org/stamp/stamp.jsp?tp=&arnumber=8367748 (Year: 2018).*

(Continued)

*Primary Examiner* — Jeremiah L Avery
(74) *Attorney, Agent, or Firm* — D2 Worldwide LLC; Frank Liebenow

(57) ABSTRACT

A computer security system with enhanced whitelisting includes user interfaces that accept user inputs to create and modify a set of rules that define which programs are allowed to execute on one or more target systems. Upon an attempt to run a program, the set of rules are used to determine if the program is allowed to run. If any rule indicates that the program is allowed to run, the program is run. Otherwise, a user interface is presented to either block execution of the program or to create a new rule that would allow execution of the program this time and in the future.

20 Claims, 16 Drawing Sheets

(56) References Cited

U.S. PATENT DOCUMENTS

| | | | | |
|---|---|---|---|---|
| 2014/0032691 | A1* | 1/2014 | Barton | H04L 51/08 |
| | | | | 709/206 |
| 2015/0339475 | A1* | 11/2015 | Feroz | G06F 21/566 |
| | | | | 726/23 |
| 2016/0359913 | A1* | 12/2016 | Gupta | G06F 21/552 |
| 2016/0373486 | A1* | 12/2016 | Kraemer | H04L 63/1441 |
| 2018/0307840 | A1* | 10/2018 | David | G06F 21/64 |
| 2019/0325135 | A1* | 10/2019 | David | H04L 63/145 |
| 2020/0302058 | A1* | 9/2020 | Kenyon | G06F 21/554 |
| 2020/0394295 | A1* | 12/2020 | Ikram | G06F 21/566 |

OTHER PUBLICATIONS

Powers, Josh et al. Whitelist malware defense for embedded control system devices. 2015 Saudi Arabia Smart Grid (SASG). https://ieeexplore.ieee.org/stamp/stamp.jsp?tp=&arnumber=7449271 (Year: 2015).*

Wibowo, Fahrudin Mukti et al. Collaborative Whitelist Packet Filtering Driven by Smart Contract Forum. 2019 International Seminar on Research of Information Technology and Intelligent Systems (ISRITI). https://ieeexplore.ieee.org/stamp/stamp.jsp?tp=&arnumber=9034654 (Year: 2019).

Rezvani, Mohsen et al. Anomaly-free policy composition in software-defined networks. 2016 IFIP Networking Conference (IFIP Networking) and Workshops. https://ieeexplore.ieee.org/stamp/stamp.jsp?tp=&arnumber=7 497226 (Year: 2016).

* cited by examiner

| | | | 746 | 748 | 750 | |
|---|---|---|---|---|---|---|
| Super Shield Report | | | | | | ← 740 |
| Description — 742 | 744 — Date Added | File Hash | Level | Type | Action | |
| Microsoft® Windows® Script Host | 4/1/20 | 0xB0C2FDAC14A9F9AA | PC | OS1 | Remove | — 752 |
| PCM Scheduler EndPoint Agent | 9/4/20 | 0xB0C2FDAC14A9F9AA | PC | OS1 | Remove | — 752 |
| | | | | | | — 86 |

*FIG. 15*

SYSTEM, METHOD, AND APPARATUS FOR ENHANCED WHITELISTING

CROSS-REFERENCE TO RELATED APPLICATION

This application is a continuation-in-part of U.S. patent application Ser. No. 17/018,427, filed Sep. 11, 2020, the disclosure of which is hereby incorporated by reference.

FIELD

This invention relates to computer security and more particularly to a system for providing enhanced white list operations.

BACKGROUND

Currently, many software systems attempt to provide a secure computing environment. Such systems are typically referred to as firewalls, anti-malware software, etc. Any computer (including cellular phones) that is connected to a network is subject to intrusion from that network.

Today, many intrusions start with reception of malicious software, typically a script or executable. Malicious software is typically a software program that gets installed on the user's computer sometime without permission or knowledge of the user. In some instances, the malicious software is delivered to the user in an email, typically an attached file, or from a web site. Upon opening of the file, the malicious software is copied onto the user's computer storage and begins to run.

To prevent such malicious software from infecting a computing environment, some anti-malware software works on a principle of whitelists. With such, any program that is not on a whitelist (e.g. a list of approved programs) is blocked. Therefore, if a new malicious software is introduced to a user's computer, it will likely not be on the whitelist and, therefore, be blocked from executing. A whitelist requires users and/or administrators to constantly update their whitelists to include new programs that are needed/desired. This is a small price to pay for the added security.

Even though whitelisting is more secure, whitelisting does result in more blocking of programs that are not malicious, called false positives. Therefore, more programs that the user knows are trustworthy are blocked from execution until the user adds the program to the whitelist, which in some corporate environments, requires requesting such from an information technology (IT) team.

What is needed is a manual or automatic method of allowing execution of programs that are likely to be safe (likely not malicious) in a whitelist environment.

SUMMARY

A system for whitelisting with override is described. The system uses one or more whitelists of trusted programs to determine if a program is safe to run. In the past, as new software is introduced, downloaded and/or run (attempted) by users, execution is prevented because such software is not included in the whitelist. This prevents unauthorized execution of software that may be malware. Once a new program is verified not to contain malware, the new software is added to the whitelist of trusted programs (e.g. by the user or an Information Technologist). The system for whitelisting with override provides options to the users and/or information technology team to allow programs to run beyond those listed in the whitelist based upon rules of known or expected norms. For example, if programs are often executed from a specific directory path or folder (e.g., C:/windows/system32), and there are no known virus programs that are installed in that path, then, after user/IT acceptance, other programs that execute from that path are deemed trustworthy and allowed to run. Note that this is an example, and many other types of such overriding is anticipated. As an example, the rules are created by a provider of the system based upon research and monitoring user behaviors as well as activities of other users inside the user's organization, in a geographic location, or worldwide.

In in the above same scenario, a virus is detected installed in this same directory path on the user's system or any system in the world, notification of such is distributed to all systems equipped with such whitelisting with overrides and permissions previously provided to allow any program to run from that directory path are revoked, requiring the user or information technology team to individually add any software programs that are needed to the whitelist, as those residing in that directory path will no longer be allowed to run based upon being in that directory.

Although directory path is one basis for allowing an override of whitelists, other basis is anticipated, for example, all programs sharing a common certification as a known program that is already on the white list or recognizing new programs are installed weekly on the same day and into the same path. In some embodiments, multiple basis is combined such as sharing a common certificate and a common directory path. In some embodiments, history of the user and/or external users is monitored so that if the user has allowed execution of a particular program several times or if many other users have added a particular program to their whitelist, that program is deemed benign and the user is able to add it to their whitelist by such rules.

In one embodiment, the system for computer security is disclosed. The system includes a target computer having non-transitory storage and a whitelist accessible by the target computer. The whitelist contains a list of programs that are approved to run on the target computer. There is a set of rules that are accessible by the target computer that has rules for determining if a program is benign. Software stored in the non-transitory storage of the target computer runs on the target computer and detects an attempt to run the program on the target computer. The software determines if the program is in the whitelist and if the program is present in the whitelist, the software allows the program to run. If the program is not found in the whitelist, the software determines if the program is benign based upon the set of rules and if the software determines that the program is benign based upon one rule of the set of rules, the software prompts informing the user of the suggested rule and requesting approval to allow the program and any other program that conforms to the one rule. If the software receives an approval, the software runs the program and updates the whitelist according to the one rule, allowing future attempts to run the program or other programs that conform to the one rule If the software receives a denial, the software does not allow execution of the program.

In another embodiment, a system for computer security is disclosed. The system includes a target computer having non-transitory storage and a whitelist accessible by the target computer. The whitelist contains a list of programs that are approved to run on the target computer. There is a set of rules that are accessible by the target computer that has rules for determining if a program is benign. Software stored in the non-transitory storage of the target computer and running on the target computer detects an attempt to run the program on the target computer. The software then determines if the program is in the whitelist and if the program is present in the whitelist, the software allows the program to run. If the program is not found in the whitelist, the software determines if the program is benign based upon the set of rules and if the software determines that the program is benign based upon one rule of the set of rules, the software running on the target computer runs the program updates the whitelist according to the one rule, and allows future attempts to run the program. If, instead, the software determines that the program is not benign based upon any rule of the set of rules, the software does not allow execution of the program In another embodiment, a method of protecting a target computer is disclosed, the method includes providing a whitelist that has identifications for known applications that are believed safe to run and providing a set of rules, the set of rules for determining if a program is benign. Upon an attempt to initiate a program on the computer, determining if the program corresponds to one of the identifications in the whitelist and if the program corresponds to any one of the identifications in the whitelist, allowing the program to run. If the program does not correspond to one of the identifications in the whitelist, determining if the program is benign based upon the set of rules and if the program is benign based upon one rule of the set of rules, running the program and updating the whitelist according to the one rule, thereby allowing future attempts to run the program. If the determining if the program is benign indicates that the program in not benign, not allowing execution of the program.

BRIEF DESCRIPTION OF THE DRAWINGS

The invention can be best understood by those having ordinary skill in the art, by referencing the following detailed description when considering the accompanying drawings, in which:

FIGS. 10-15 illustrate exemplary user interfaces of the computer security system with enhanced whitelisting.

DETAILED DESCRIPTION

Figure 1:
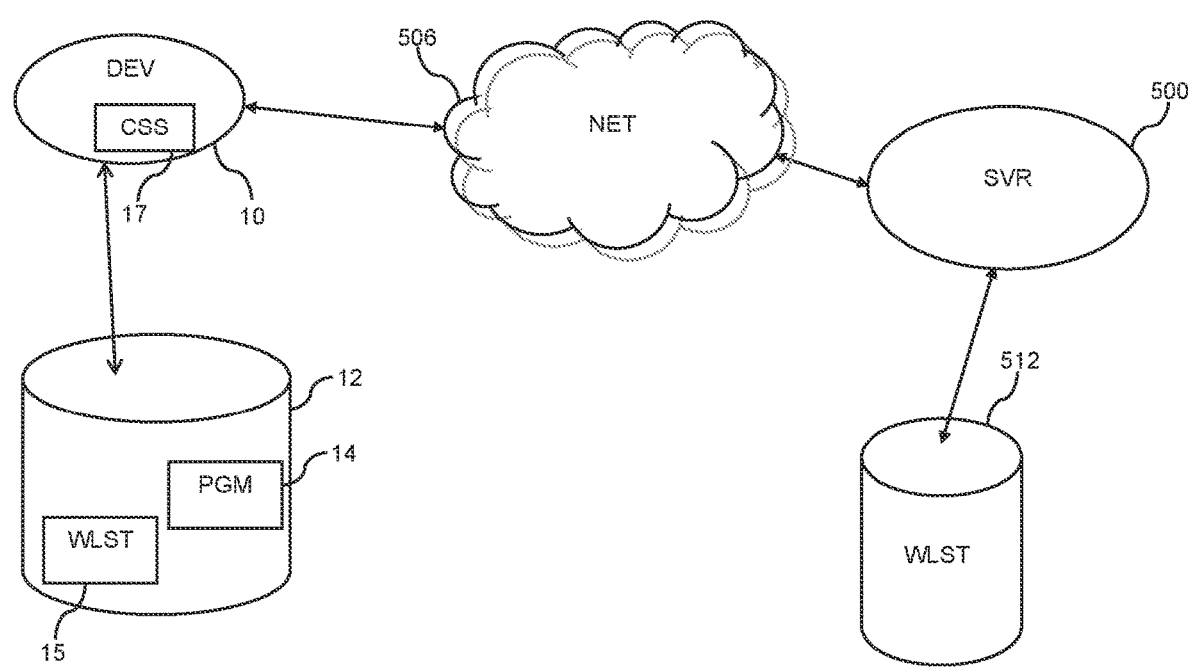
FIG. 1 illustrates a data connection diagram of the computer security system with enhanced whitelisting.

Reference will now be made in detail to the presently preferred embodiments of the invention, examples of which are illustrated in the accompanying drawings. Throughout the following detailed description, the same reference numerals refer to the same elements in all figures.

In general, a whitelist-based computer security system provides an automated way to prevent execution of software containing code that is contaminated (e.g. contains or is malicious software). Before execution of any code on the target computer system, a test is performed by checking one or more whitelists to determine if the code has been approved for execution on the target computer system and, if the code is on the whitelist, allowing execution of the code. Otherwise, the computer security system blocks execution.

Throughout this description, the term, "computer" refers to any system that has a processor and runs software. Examples of such are: a personal computer, a server, a notebook computer, a tablet computer, a smartphone, a smart watch, a smart television, etc. The term, "user" refers to a human that has an interest in the computer, perhaps a user who is using the computer.

Throughout this description, the term "directory" or "directory path" describes a hierarchical pathway to a particular folder in which files (e.g. data or programs) are stored. For example, "C:/windows/system32" refers to files stored in a folder called "system32" which is a subfolder of another folder called "windows" which is a top-level folder of a storage device known as "C." Note that the storage device (e.g. C:) is at times a physical device (e.g. a separate disk drive) or a logical device (e.g. a portion of a disk drive). Also note that the described representation (e.g. "C:/windows/system32") is a human-readable representation of such hierarchy used by certain operating systems and any such representation is anticipated and included herein (e.g. some representations use backslashes instead of slashes).

Throughout this description, the term, "malicious software" or "malware" refers to any software having ill-intent. Many forms of malicious software are known; some that destroy data on the host computer; some that capture information such as account numbers, passwords, etc.; some that fish for information (phishing), pretending to be a known entity to fool the user into providing information such as bank account numbers; some encrypt data on the computer and hold the data at ransom, etc. A computer virus is a form of malicious software.

In general, the user of the system, method, and apparatus being described utilizes efficient storage and retrieval mechanisms to determine if a program (e.g. an executable, macro, form, etc.) is identified within a list. A hash table is one such mechanism, though other mechanisms are equally anticipated and included here within. As an efficient way of characterizing the questionable program, in some embodiments, it is anticipated that rather than storing the entire program in such tables, a portion of the program is stored, often referred to as a signature of the program. The signature contains key sequences found within the program; finding of such key sequences typically indicates that the program matches the signature.

Referring to FIG. 1 illustrates a data connection diagram of the exemplary computer security system with enhanced whitelisting. In this example, a target computer 10 (e.g., a personal computer that is being protected) communicates through a network 506 (e.g. the Internet, local area network, etc.) to a server computer 500.

The server computer 500 has access to data storage 512. One item in the data storage 512 is a whitelist 15; for example, a whitelist 15 of programs/applications that are known to be of low risk of malware. In some embodiments, the data storage 512 is in the cloud. Although one path between the target computer 10 and the server computer 500 is shown going through the network 506 as shown, any known data path is anticipated. For example, the Wi-Fi transceiver 96 (see FIG. 2) of the target computer 10 is used to communicate with the wide area network 506, which includes the Internet, and, consequently, with the server computer 500.

The server computer 500 transacts with computer security system software that runs on the target computer 10 through the network(s) 506. The computer security system software 17 runs on the target computer 10 and monitors any activation of programs/applications/scripts (e.g. running of a program) and provides or denies permission for running the program/application/script on the target computer 10. The program/application/script is allowed to run when the programs/applications/scripts is deemed malware-free (e.g. is in the whitelist 15). Information is also transferred from computer security system software 17 that runs on the target computer 10 to the server computer 500 regarding potential threats, etc.

The server computer 500 transacts with the computer security system software 17 that runs on the target computer 10 as needed, for example, to update the whitelists 15 stored on the target computer 10.

The computer security system software 17 that runs on the target computer 10 selectively provides execution approval to software that attempts to execute on the target computer 10. In such, if approval is provided, the software is able to execute on the target computer 10. If approval is not provided, the software is blocked from executing on the target computer 10 and various additional steps are taken such as logging the attempt, transferring the suspect software to the server computer 500 for analysis, informing the user of the target computer 10, etc.

Figure 2:
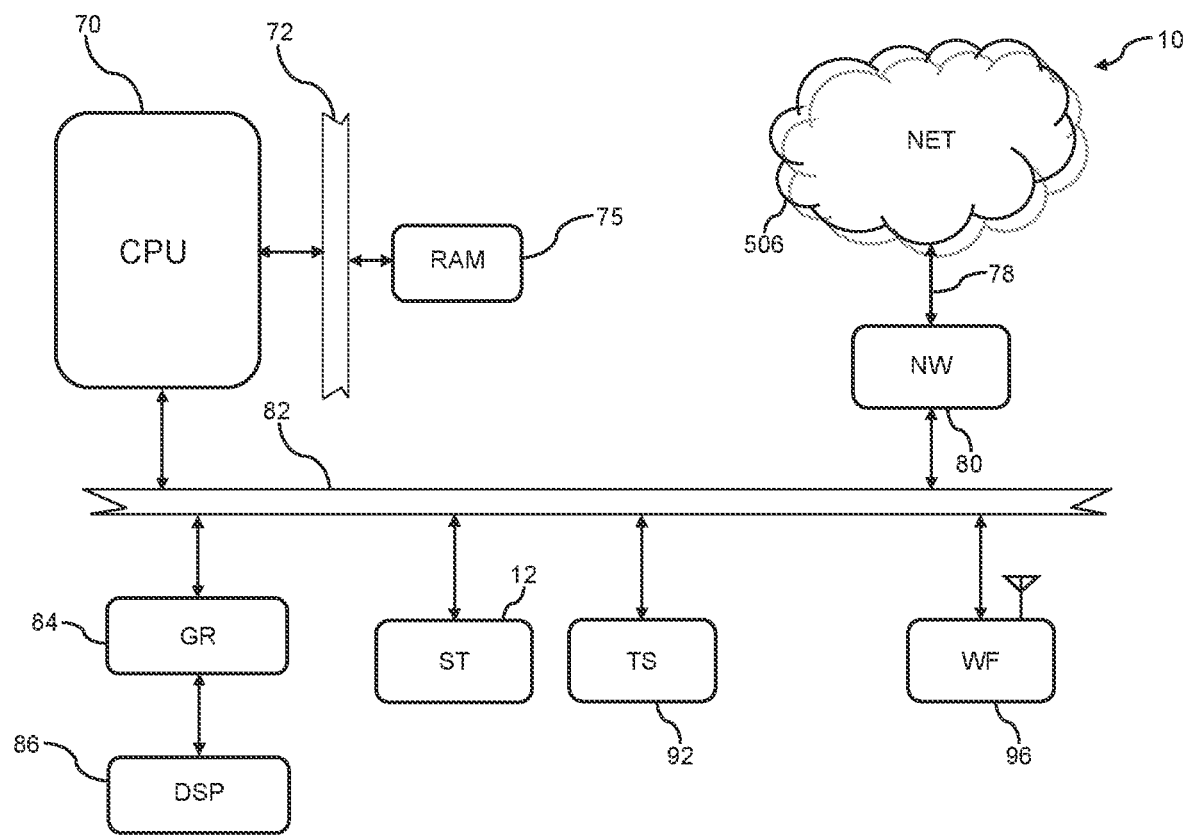
FIG. 2 illustrates a schematic view of a typical computer protected by the computer security system with enhanced whitelisting.

Referring to FIG. 2, a schematic view of a typical target computer 10 is shown. The computer security system software 17 running on the target computer 10 executes on any processor-based device (e.g., target computer 10) for providing protection against programs/applications/scripts that contain malicious software (malware). The present invention is in no way limited to any particular computer. Protection for many other processor-based devices are equally anticipated including, but not limited to smart phones, cellular phones, portable digital assistants, routers, thermostats, fitness devices, smart watches etc.

The example target computer 10 represents a typical device that is protected by computer security system software 17 that runs on the target computer 10. This exemplary target computer 10 is shown in its simplest form. Different architectures are known that accomplish similar results in a similar fashion, and the present invention is not limited in any way to any particular computer system architecture or implementation. In this exemplary target computer 10, a processor 70 executes or runs programs in a random-access memory 75. The programs are generally stored within a persistent memory, storage 12, and loaded into the random-access memory 75 when needed. The processor 70 is any processor, typically a processor designed for phones. The random-access memory 75 is interfaced to the processor by, for example, a memory bus 72. The random-access memory 75 is any memory suitable for connection and operation with the selected processor 70, such as SRAM, DRAM, SDRAM, RDRAM, DDR, DDR-2, etc. The storage 12 is any type, configuration, capacity of memory suitable for persistently storing data, for example, flash memory, read only memory, battery-backed memory, hard disk, etc. In some exemplary target computers 10, the storage 12 is removable, in the form of a memory card of appropriate format such as SD (secure digital) cards, micro SD cards, compact flash, etc.

Also connected to the processor 70 is a system bus 82 for connecting to peripheral subsystems such as a cellular network interface 80, a graphics adapter 84 and user I/O devices 91 such as mice, keyboards, touchscreens, etc. The graphics adapter 84 receives commands from the processor 70 and controls what is depicted on the display 86. The user I/O devices 91 provides navigation and selection features.

In general, some portion of the storage 12 is used to store programs, executable code, and data, etc. In some embodiments, other data is stored in the storage 12 such as audio files, video files, text messages, etc.

The peripherals shown are examples, and other devices are known in the industry such as Global Positioning Subsystems, speakers, microphones, USB interfaces, cameras, microphones, Bluetooth transceivers, Wi-Fi transceivers 96, image sensors, temperature sensors, etc., the details of which are not shown for brevity and clarity reasons.

In some embodiments, a network interface 80 connects the target computer 10 to the network 506 through any known or future protocol such as Ethernet, Wi-Fi, GSM, TDMA, LTE, etc., through a wired or wireless medium 78. There is no limitation on the type of connection used. In such, the network interface 80 provides data and messaging connections between the target computer 10 and the server computer 500 through the network 506.

Figure 3:
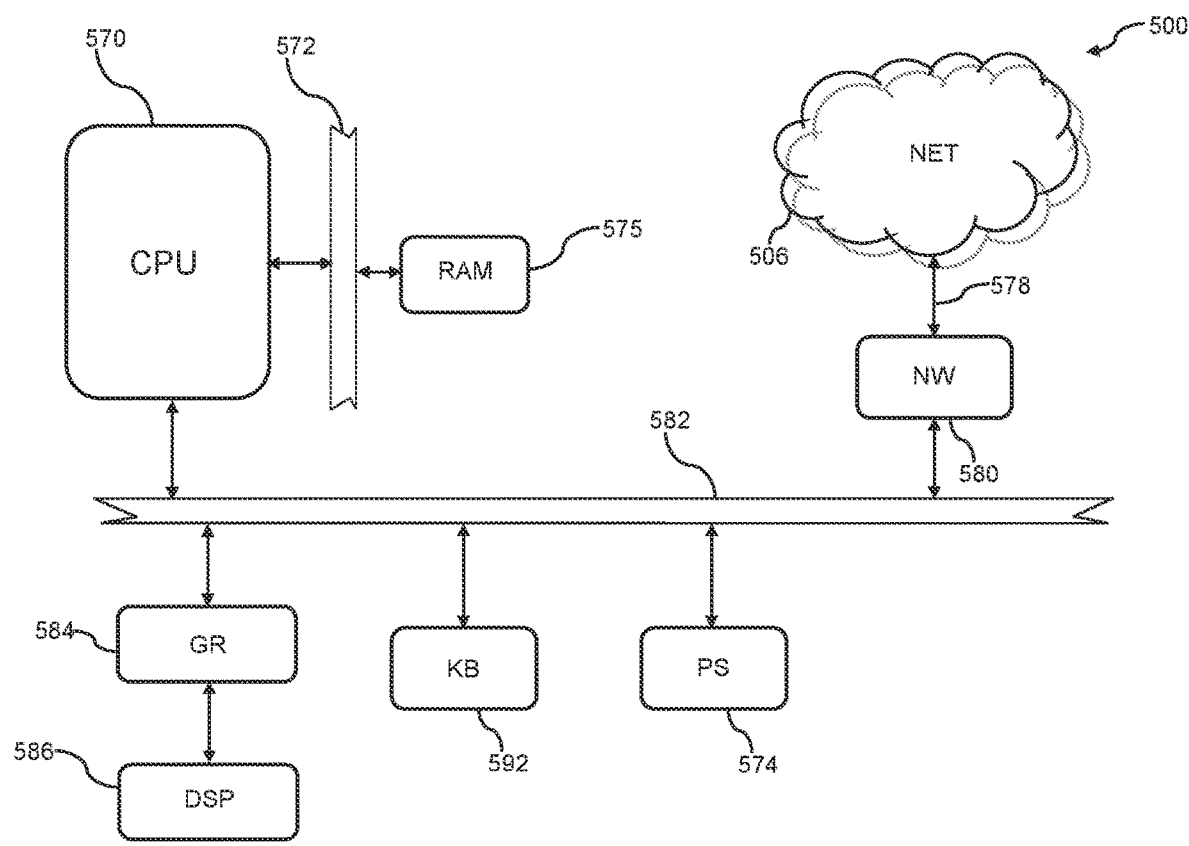
FIG. 3 illustrates a schematic view of a typical server computer system.

Referring to FIG. 3, a schematic view of a typical server computer system (e.g., server computer 500) is shown. The example server computer 500 represents a typical server computer system used for back-end processing, generating reports, displaying data, etc. This exemplary server computer 500 is shown in its simplest form. Different architectures are known that accomplish similar results in a similar fashion and the present invention is not limited in any way to any particular computer system architecture or implementation. In this exemplary computer system, a processor 570 executes or runs programs in a random-access memory 575. The programs are generally stored within a persistent memory 574 and loaded into the random-access memory 575 when needed. The processor 570 is any processor, typically a processor designed for computer systems with any number of core processing elements, etc. The random-access memory 575 is connected to the processor by, for example, a memory bus 572. The random-access memory 575 is any memory suitable for connection and operation with the selected processor 570, such as SRAM, DRAM, SDRAM, RDRAM, DDR, DDR-2, etc. The persistent memory 574 is any type, configuration, capacity of memory suitable for persistently storing data, for example, magnetic storage, flash memory, read only memory, battery-backed memory, magnetic memory, etc. The persistent memory 574 is typically interfaced to the processor 570 through a system bus 582, or any other interface as known in the industry.

Also shown connected to the processor 570 through the system bus 582 is a network interface 580 (e.g., for connecting to a data network 506), a graphics adapter 584 and a keyboard interface 592 (e.g., Universal Serial Bus—USB). The graphics adapter 584 receives commands from the processor 570 and controls what is depicted on a display 586. The keyboard interface 592 provides navigation, data entry, and selection features.

In general, some portion of the persistent memory 574 is used to store programs, executable code, data, and other data, etc.

The peripherals are examples and other devices are known in the industry such as pointing devices, touch-screen interfaces, speakers, microphones, USB interfaces, Bluetooth transceivers, Wi-Fi transceivers, image sensors, temperature sensors, etc., the details of which are not shown for brevity and clarity reasons.

Referring to FIGS. 4, 5, 6, and 6A, exemplary user interfaces 100, 100A, 100B of the computer security system with enhanced whitelisting are shown. Although many user interfaces are anticipated, one set of examples are shown for brevity reasons. The user interfaces 100, 100A, 100B that are shown represent that a program 14 is stored on the target computer 10. There are many ways for this program 14 to be loaded and executed on the target computer 10, for example, through an email system, through a browser, through a forms interface, etc. The computer security system software 17 intercepts and processes all requests to initiate operation of any type of program.

Figure 4:
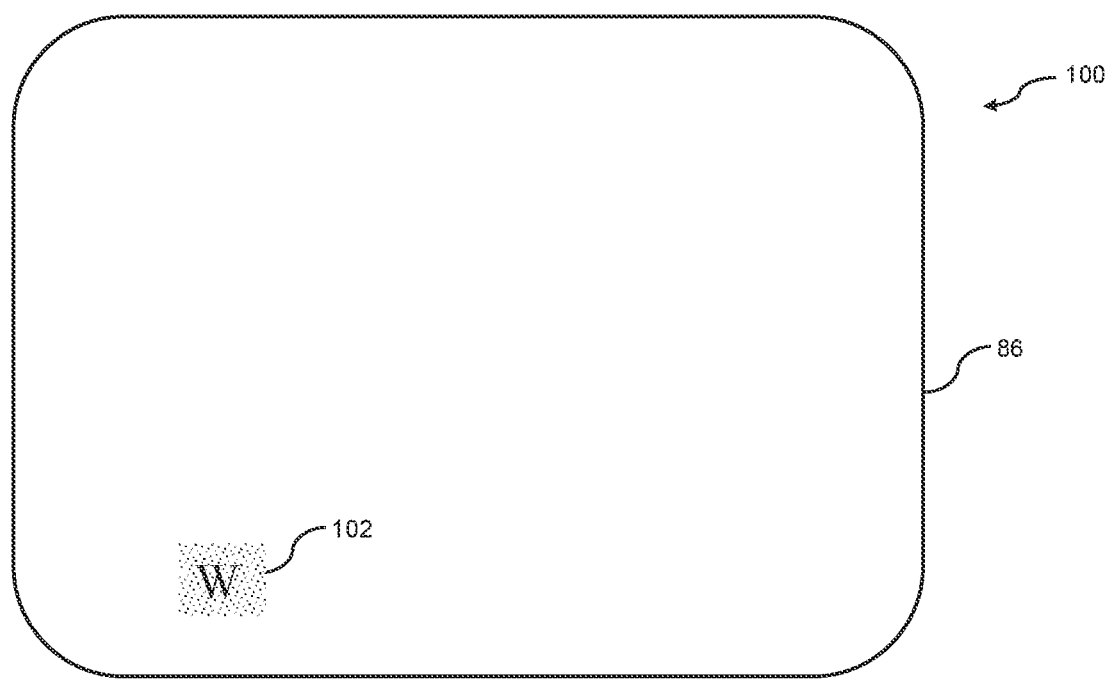
FIG. 4 illustrates a computer user interface of the computer security system with enhanced whitelisting.

One such example program 14 is shown in a user interface 100 of FIG. 4. A program 14 (e.g., a word processing program) is represented as an icon 102 on a user's display 86. As with many windowing programs, a user typically selects the icon 102, usually double-clicking on the icon 102, and the operating system and/or user interface software initiates execution of the program 14 on the target computer 10. For example, in some operating systems, double clicking on a word processor icon initiates (runs) a word processing program that is associated with the word processor icon.

Figure 6:
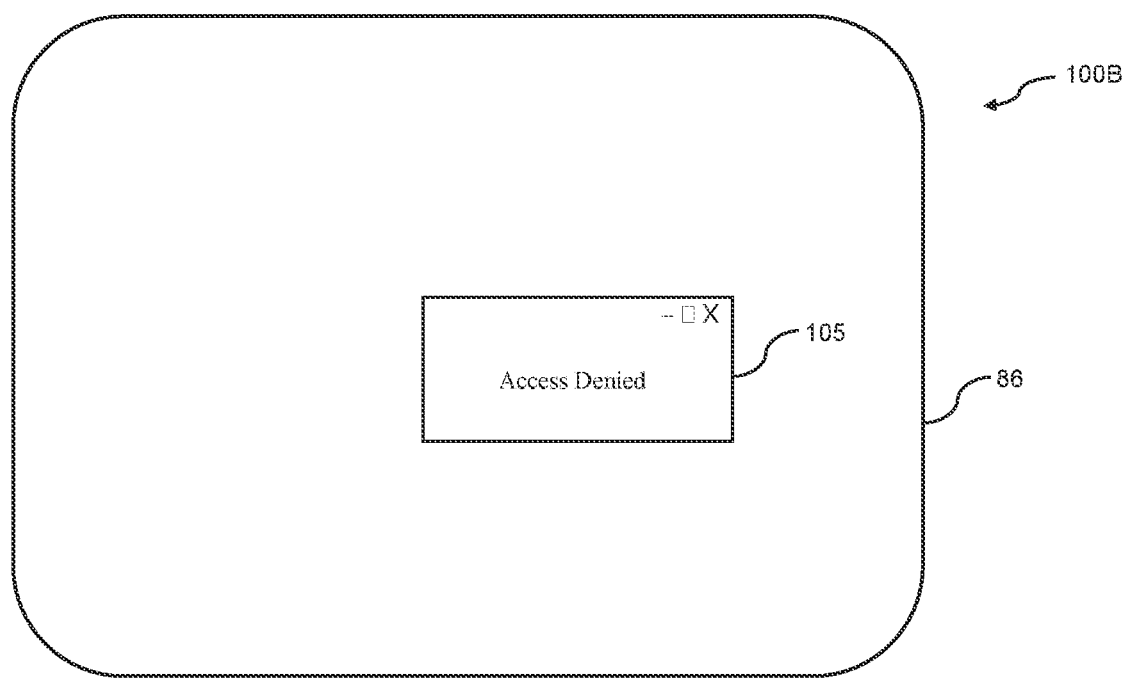
FIG. 6 illustrates a third computer user interface of the computer security system with enhanced whitelisting.
Figure 6A:
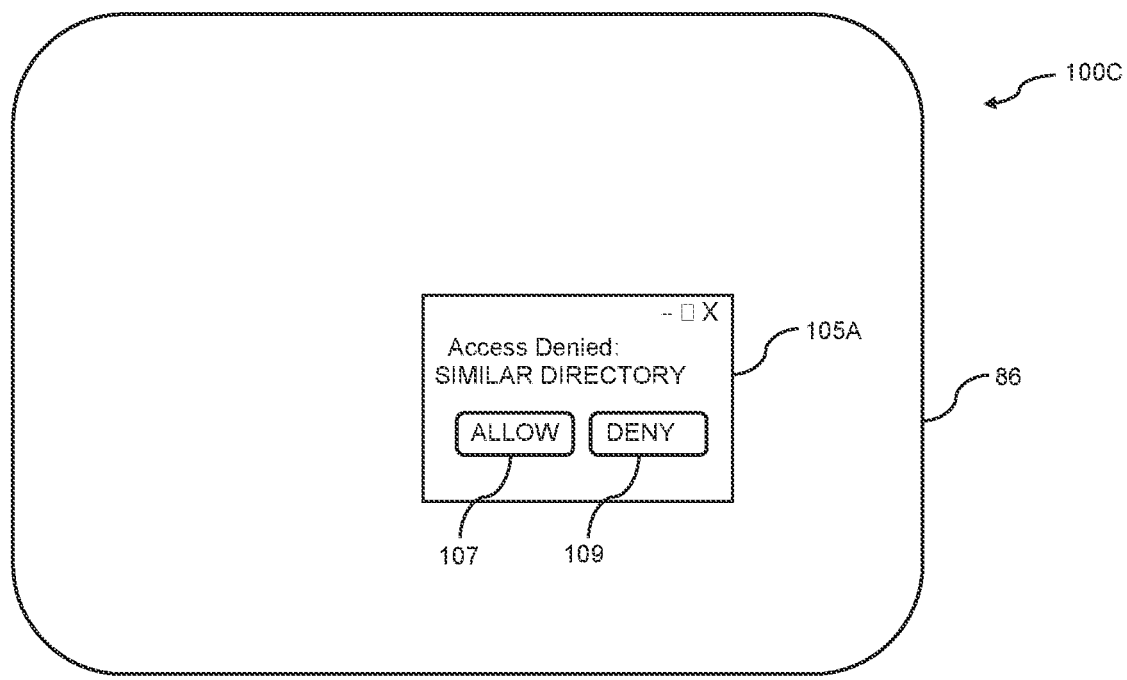
FIG. 6A illustrates a fourth computer user interface of the computer security system with enhanced whitelisting.
Figure 7:
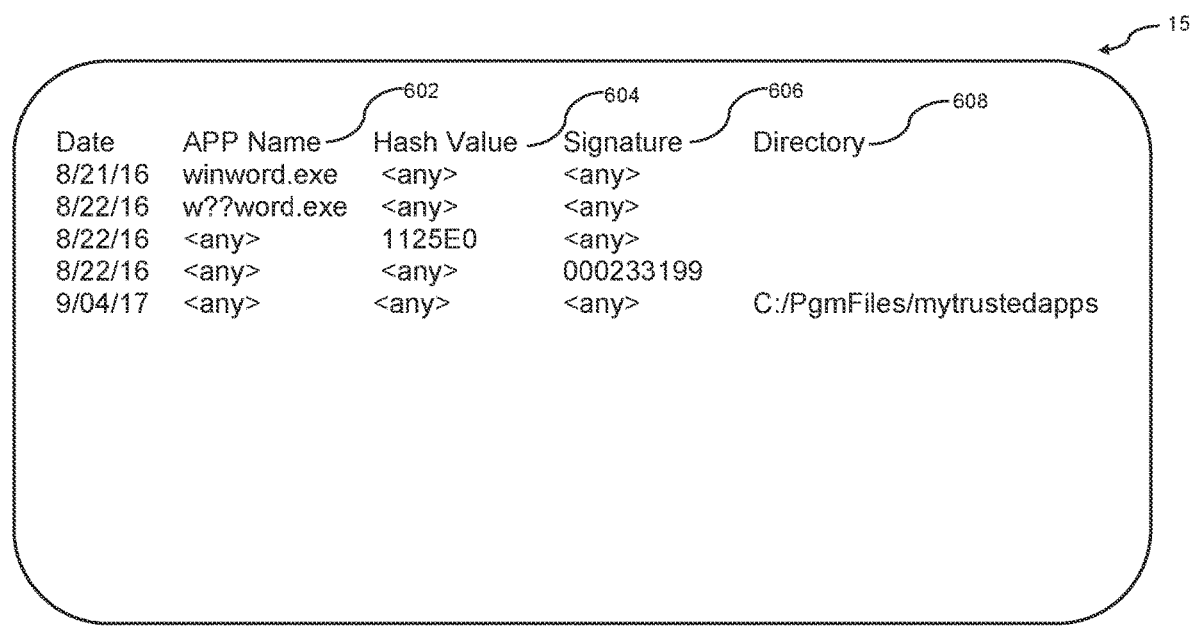
FIG. 7 illustrates an exemplary white list of the computer security system with enhanced whitelisting.

After the user selects the icon 102 (e.g. double clicking) and the operating system of the target computer 10 attempts to initiate/run the program 14 associated with the icon 102, the computer security system software 17 analyzes the program 14 associated with the icon 102 and determines if the program 14 is contained in the whitelist 15 (see FIG. 7). If the program 14 associated with the icon 102 is listed in the whitelist 15, the program 14 is deemed to not contain malware and allowed to run. In the past, if the program associated with the icon 102 was not found in the whitelist 15, it was deemed to be/contain malware and prevented from running and an error message 105 was displayed. Now, based upon user security settings and global information distributed to the computer security system software 17 running on each target computer 10, the computer security system software 17 will make intelligent decisions as to whether the program 14 associated with the icon 102 is benign based upon any of several factors, and if it is determined that the program 14 associated with the icon 102 is benign, the computer security system software 17 will request that the user permit execution of the program 14 associated with the icon 102 as shown in FIG. 6A using a message window 105A.

Although there are many anticipated ways to make this intelligent decision, one example includes the file location from which the program 14 associated with the icon 102 comes. In one example, if the program 14 associated with the icon 102 is stored in a directory that another program(s) that are already in the whitelist are stored, then there is a greater chance that the program 14 associated with the icon 102 is benign, as virus software usually tries to hide in directories that are rarely visited. As an example, when a user that often executes one program that is stored in a directory "C:/PgmFiles/mytrustedapps," tries to run another program from that same directory, it is more than likely that the second program is benign.

In such, upon user agreement, execution of any program in said directory will be permitted unless any program is uncovered (local or worldwide) that is found to contain malware and is stored in this directory. Therefore, as malware evolves and someone creates malware that utilizes this directory, the server computer 500 downloads such information to the computer security system software 17 and the computer security system software 17 invalidates the setting, requiring the user/information technology person to update the whitelist 15 and add whichever programs are known to be benign that reside in that directory.

In FIG. 6A it was determined that the program is not allowed to run and the message window 105A is displayed. The message window 105A has options for the user to add the program to the whitelist in a specific way. In the example of FIG. 6A, it is suggested to add the program to the whitelist in such a way that the program and other programs that run in the same directory will be allowed (e.g. whitelisted). There are many ways to implement such a whitelist, are of which are anticipated here within. The message that appears in the error message window 105 is based upon analysis of the program that is attempted to be run with respect to various aspects of the program such as the program's name, certificate, path/folder, etc. In some embodiments, history is used to suggest a whitelisting strategy, including historic whitelisting by other users either within the same company or world-wide. For example, if the program is called "chrome.exe" and was previously enabled by hash value and each time an update to "chrome.exe" is made/loaded, the hash value does not match, the message window 105A will suggest whitelisting by program name so that the user does not find the error the next time "chrome.exe" is updated. Further, if many people in the same organization or world-wide have whitelisted "chrome.exe" running out of a specific directory, then the message window 105A would suggest whitelisting "chrome.exe" by name and folder. If many other users have whitelisted several programs in the same folder, then the message window 105A will suggest whitelisting the entire folder, etc.

In some embodiments, it is already known that some form of malware utilizes a specific directory such as a download directory or temporary files directory. In such, the server computer 500 periodically downloads such information to the computer security system software 17 and the computer security system software 17 warns or prevents the user or information technologist from allowing execution of programs found in the requested directory.

Figure 5:
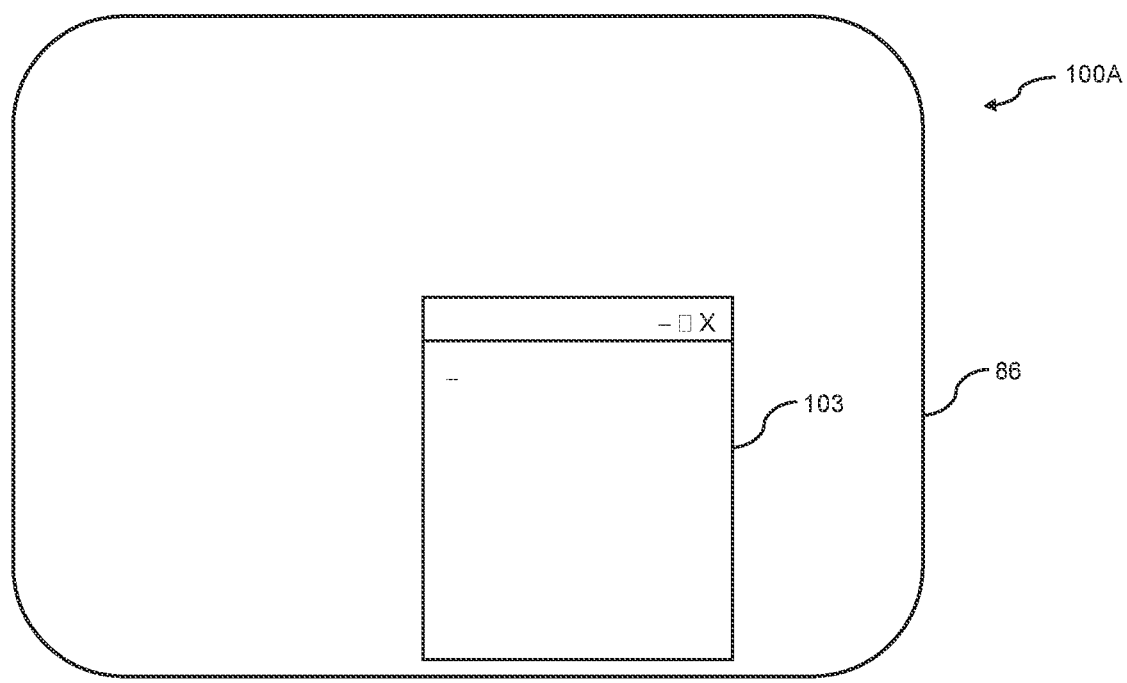
FIG. 5 illustrates a second computer user interface of the computer security system with enhanced whitelisting.

If it is determined that the program 14 is on the whitelist 15 and allowed to execute, the program 14 executes as shown in a user interface 100A of FIG. 5, for example, displaying a user interface window 103.

If the program 14 is not found in the whitelist 15 and the program 14 does not conform to any of the anticipated ways to make this intelligent decision, the program 14 is prevented from executing and a user interface 100B of FIG. 6 is presented, displaying an error message window 105. Additionally, in some embodiments, information about the attempted execution, the program, date/time, etc., are logged and/or transmitted to the server computer 500.

If, instead, the program 14 is not found in the whitelist 15 but the program 14 does conform to any of the anticipated ways to make this intelligent decision, the user interface 100C of FIG. 6A is presented, displaying a message window 105A with options for the user. One option is to allow 107. By invoking the allow 107 option of the example user interface 100C, the user is signaling the computer security system software 17 to allow this program 14 to run now and all programs stored in the same directory to have permission to run subsequently. By invoking the deny 109 option, the program 14 is not allowed run and no other programs within that directory are provided the ability to run without explicit overrides or adding that program to the whitelist 15.

Although the above includes one anticipated way to make this intelligent decision as to whether the program 14 is likely to be benign, other ways to make this intelligent decision are anticipated. For example, if multiple programs are already whitelisted in a certain path; if multiple items share the same certificate; if the program 14 resides in a directory that is writable only to the system administrator, etc.

The table of FIG. 7 depicts one implementation of a whitelist 15. As, in many target computers 10, there are many valid programs that are executed often, it is anticipated that in some embodiments, a whitelist 15 be implemented as a hash table for compact storage and speedier access. In some embodiments, there are separate whitelists for each type of whitelisting, for example, one for whitelisting by hash value, one for whitelisting by program name, etc. In this example, there is a single whitelist arranged in linear fashion with entries for each type of whitelisted element (program or directory) in the same whitelist 15.

As an example, when an attempt is made to run a program, the program name is searched in the whitelist 15 (or program name range using wild card or regular expression characters as in "w??word.exe"). If the program name is found, the program is run. If the program name is not found, a hash value of the program is calculated and the whitelist 15 is searched for that hash value. Note that hash algorithms are known and well-understood in the field of programming. If the hash value is found in the whitelist 15, the program is run. Next, the signature of the program is extracted (if the program is signed) and the whitelist is searched for the signature. If the signature is found, the program is run. If the signature is not found, the directory in which the program is located is determined and the whitelist 15 is searched for that directory. If the directory is found, the program is run. If the directory is not found, then it is determined that the program is not in the whitelist and not directly allowed to run.

Each entry of the whitelist 15 includes information regarding the approved program or directory such as the date of approval, the name of the program 602, a hash value of the program 604, and a signature of the program 606. In some embodiments, more or less information is maintained in the whitelist 15. Note that as malware becomes more sophisticated, the malware often masquerades as known, valid programs such as word processors. The hash value of the program 604 is one way to prevent this type of masquerading, as a hash value of a malware version (e.g. having the same name as the valid program) will often be different that a hash value of the program 604, as the malware version of the program will have different internal coding (e.g. the malicious code). In some embodiments, the hash value of the program 604, for example is based upon a summation/modulus or other numerical calculation based upon the entire program or a portion of the program. Any tampering with the program by, for example, a hacker, will change the calculation, resulting in a mismatch between the calculated hash value and the hash value of the program 604 from the whitelist 15, even is a size of the file in which the program is stored matches the size of the valid program.

In some embodiments, identification is by a signature of the program 606 as provided in the whitelist 15. The signature of the program 606, for example is based upon a probing of the entire program or a portion of the program. For example, the presence or absence of certain strings within the program, values at certain locations within the program, etc. Any tampering with the program for example, by a hacker, will change a calculation of the signature(s), resulting in not finding certain expected values within the signature based upon the signature of the program 606 from the whitelist 15.

In this exemplary whitelist 15, one entry added on Sep. 4, 2017, indicates that programs 14 stored within the folder 608, C:/pgmFiles/mytrustedapps, are trusted. In other words, the user tried to execute a program from the folder 608 C:/PgmFiles/mytrustedapps and when presented with the message window 105A of FIG. 6A, the user invoked the allow 107 option. In this example, once approved, any program 14 that executes in the folder 608 C:/ProgramFiles/mytrustedapps will be allowed to execute.

Note that the entries include "<any>" for certain fields. For example, in the first line of this exemplary whitelist, the name would have to match "winword.exe," but the program can have any hash value, any signature, or be located in any directory. If both name and folder have values, then in order to run the program, the program name would have to match that name and the program would have to be executing out of the identified directory.

Figure 8:
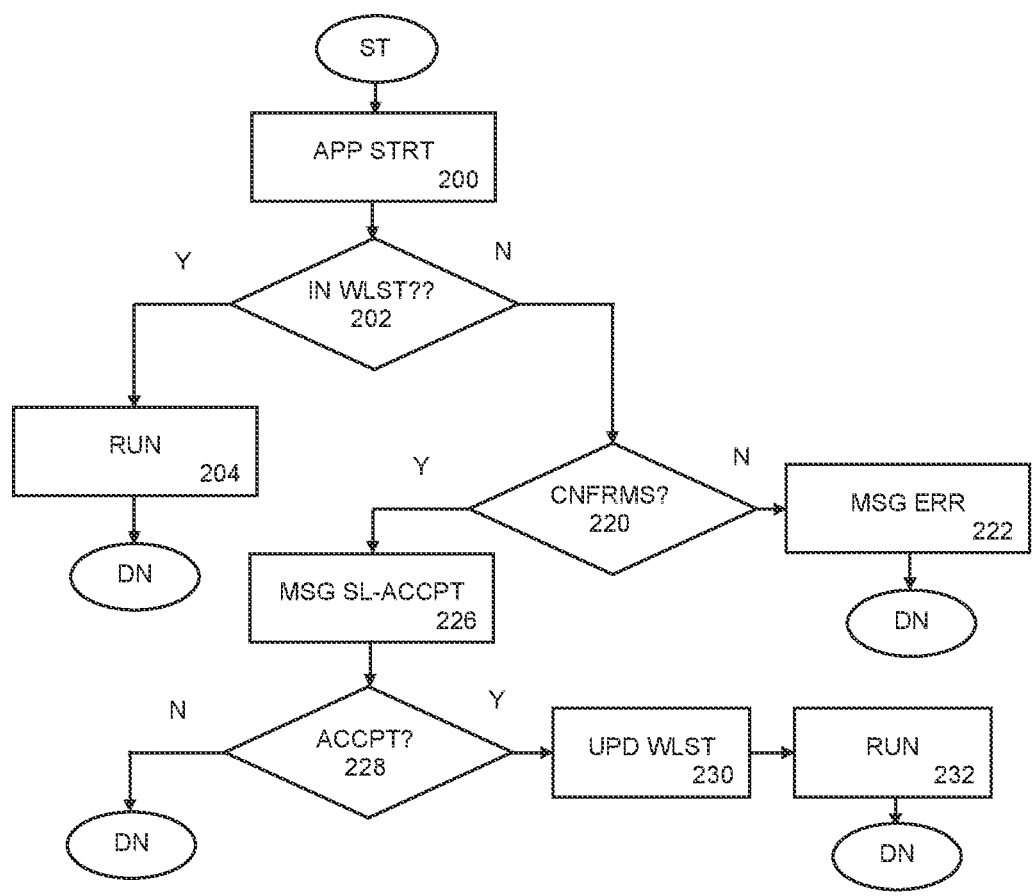
FIGS. 8-9 illustrate exemplary program flows of the computer security system with enhanced whitelisting.
Figure 9:
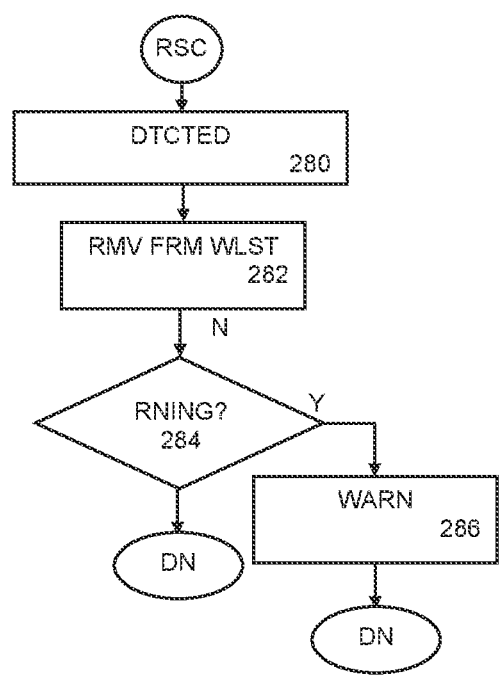

Referring to FIGS. 8-9, exemplary program flows of the computer security system with enhanced whitelisting are shown.

It is anticipated that portions of the exemplary program flow execute on a user device such as the target computer 10 while portions of the exemplary program flow execute on the server computer 500.

In this example, the flow starts by a program 14 attempting to start 200 on the computer. This step is anticipated to be performed through direct or indirect invocation by the user. In a direct invocation, the user knowingly tries to start the program 14 (e.g. software executable, application, etc.), for example, by double-clicking on a shortcut or icon of that executable. In an indirect invocation, the user initiates execution of an executable by indirect ways such as browsing to a web site, opening an email attachment, etc.

The computer security system first determines 202 if the program 14 is in the whitelist 15 using any searching mechanism, including linear searching, binary searching, hash searching, etc. For example, the name of the program is searched and if found, the search is successful. If the name is not found, then a hash value is calculated for the program and the hash value is searched and if not found, other searches are performed.

If it is determined 202 that the program 14 is in the whitelist 15 (e.g., the program is trusted) the program 14 is run 204.

If it is determined 202 that the program 14 is missing from the whitelist 15, the computer security system software 17 determines if the program 14 conforms 220 to any of the anticipated ways to make this intelligent decision. For example, the program stored in a safe directory. If the program 14 conforms 220 to any of the anticipated ways to make this intelligent decision, in some embodiments, a selection message 226 is displayed asking the user to allow all programs the conform to one of the specific ways to make the intelligent decision, similar to the message window 105A of FIG. 6A. Note that it is anticipated that when the program conforms to multiple specific ways (e.g. rules), either the best rule is selected (e.g. the safest rule) or the user is prompted to select one rule out of the multiple rules presented. If the user does not accept 228, the flow completes without running the program 14. If the user accepts 228, an entry is added 230 to the whitelist 15 and the program 14 is run 232. In some embodiments, no selection message 226 is displayed, the entry is added 230 to the whitelist 15 (e.g. similar to the rule or special entry 608 of FIG. 7) without approval and the program 14 is run 232. In some such embodiments, where the rule indicates another program in the whitelist (e.g. approved program) is stored in the same folder as the program 14, a number of approved programs is required (e.g. there must be three approved programs stored in the same folder as the program 14.

If the program 14 does not conform 220 to any of the anticipated ways to make this intelligent decision, in some embodiments, an error message is displayed 222 similar to the error message window 105 of FIG. 6 the flow completes without running the program 14.

In FIG. 9, malware was detected 280 somewhere, either on the target computer 10 or anywhere in the world, and such was communicated to the computer security system software 17 that runs on the target computer 10. Responsive to the detection, the computer security system software 17 removes 282 any rules from the whitelist 15 that would allow execution of the program 14 that was detected 280 to include malware. If it is found that the program 14 is already running, a warning message 286 is displayed to warn the user that this program 14 is currently running and it is potentially dangerous and may include malware. In this way, the user can reboot the target computer 10 or use a task manager to kill the already running program.

Referring to FIGS. 10-15, exemplary user interfaces of the computer security system are shown. User interfaces are provided for allowing or blocking certain programs on an individual computer or a set of computers. In general, any user or authorized user is able to adjust whitelists to accommodate individual programs or a set of programs on one or more computers.

Figure 10:
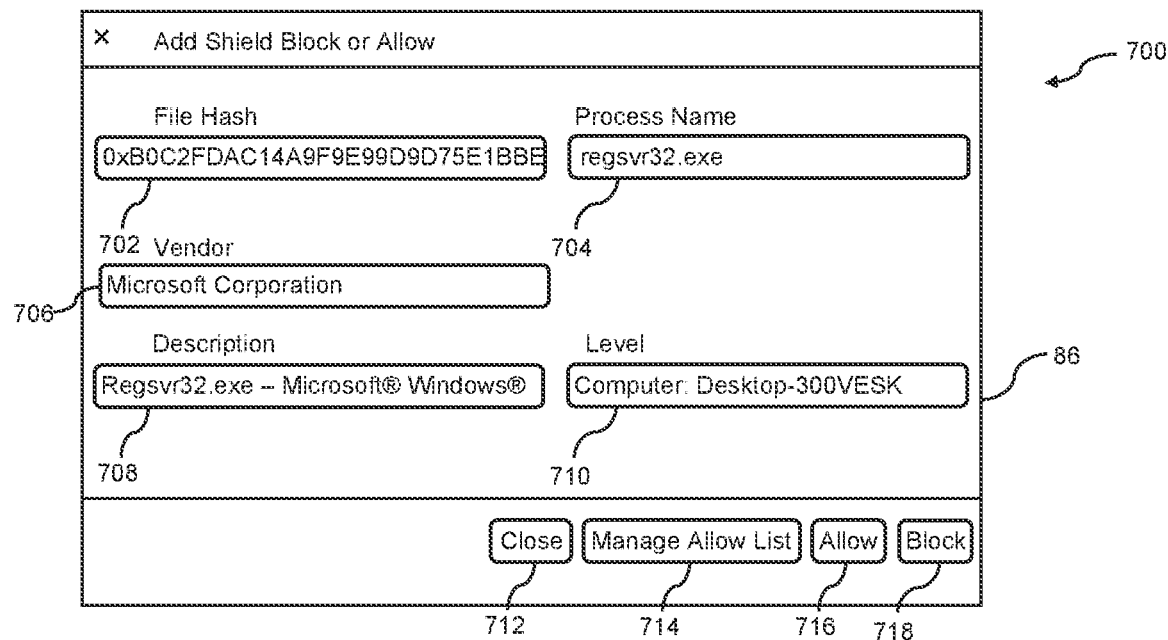

In the example of FIG. 10, an attempt to runs a program named "regsvr32.exe" was made and the block or allow user interface 700 is displayed. The hash value 702 of the program and name 704 of the program are displayed, along with the vendor/supplier 706, and a description 708 of the program are displayed. In this example, the level 710 has been selected to be "Computer" meaning that this program will only be allowed or blocked on the user's computer (as opposed to all computers in the company, in an account, or in a group in which the user's computer resides). If the "close" feature 712 is selected, nothing happens and the user interface exits. If "Manage Allow List" 714 is selected, the user is taken to a report user interface 740 (see FIG. 15). If the "allow" 716 feature is selected, the identified program is added to the whitelist (list of allowed programs) and future attempts to run the identified program are allowed on all computers in the selected level 710. If the "block" 718 feature is selected, the identified program is added to the blacklist (list of blocked programs) on all computers in the selected level 710.

Figure 11:
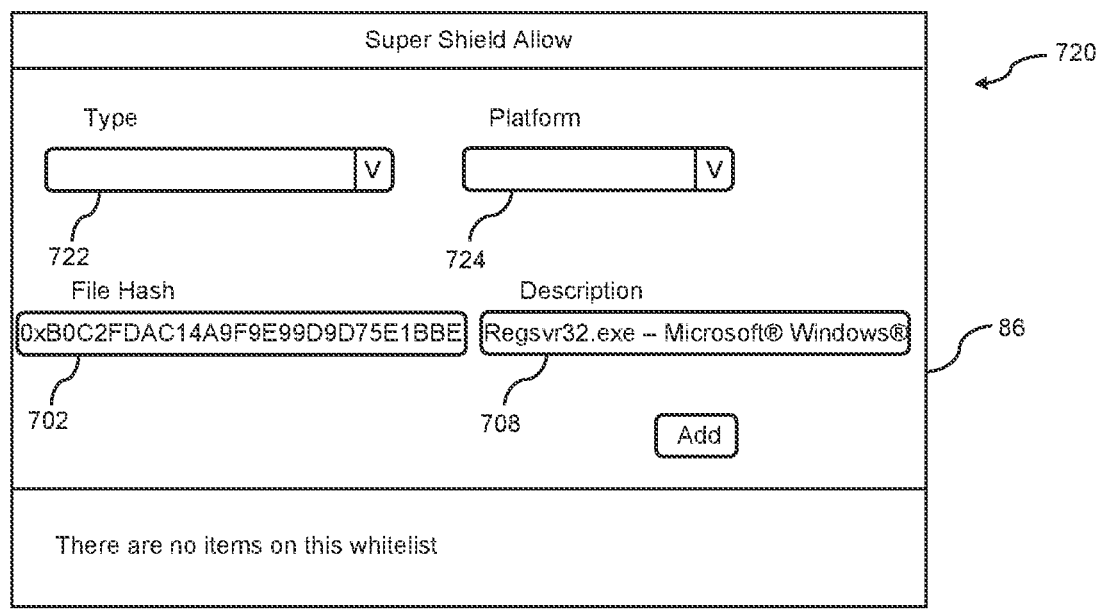
Figure 12:
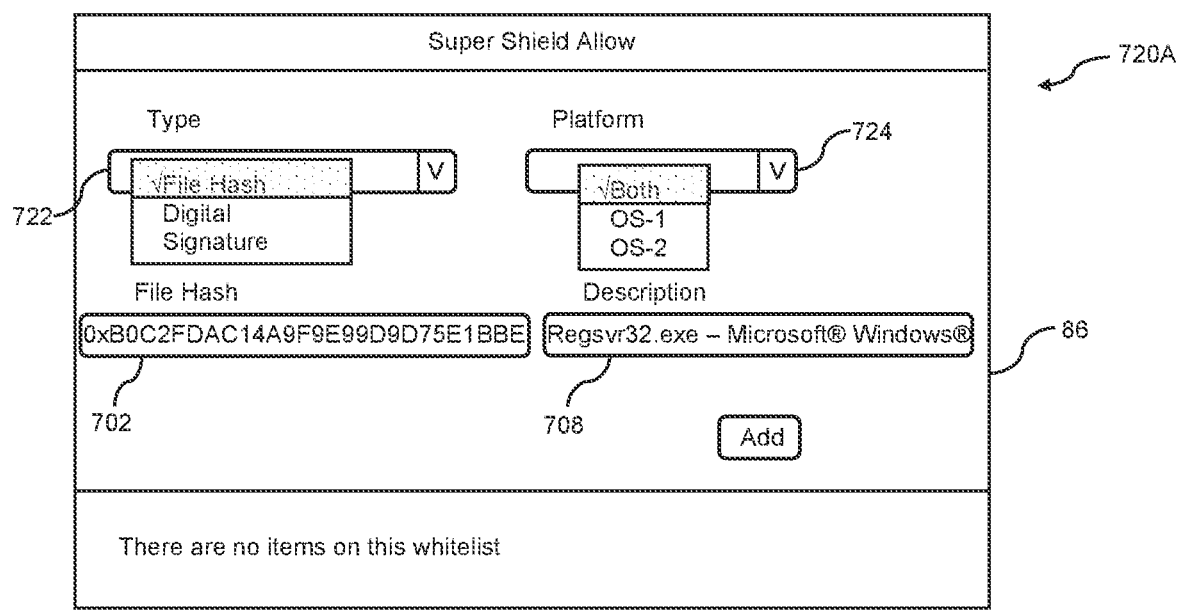
Figure 13:
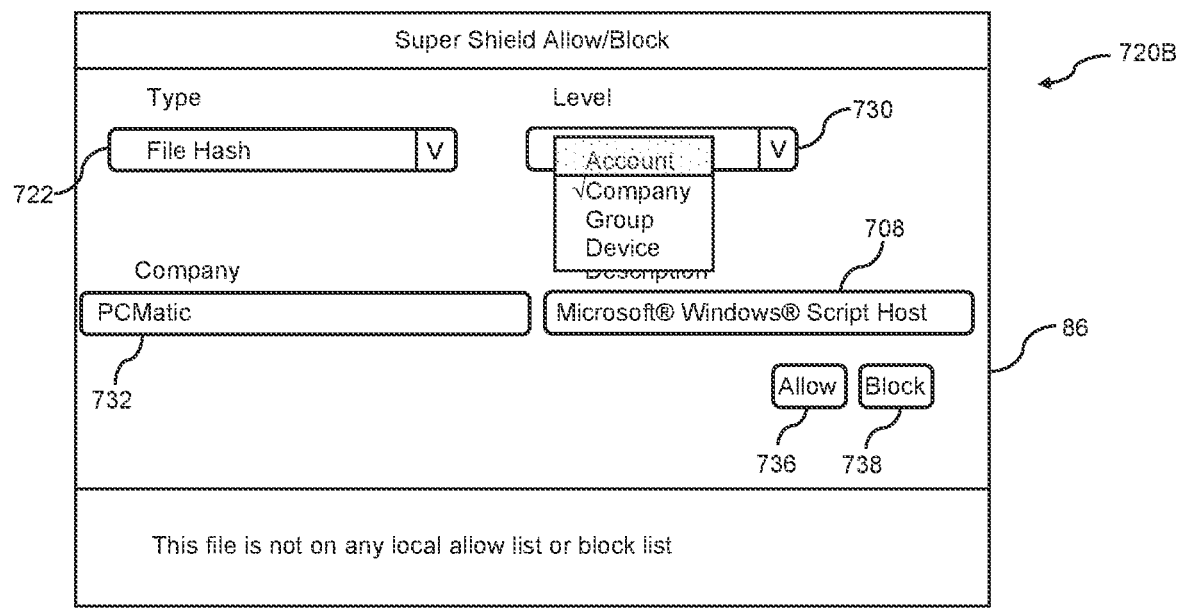
Figure 14:
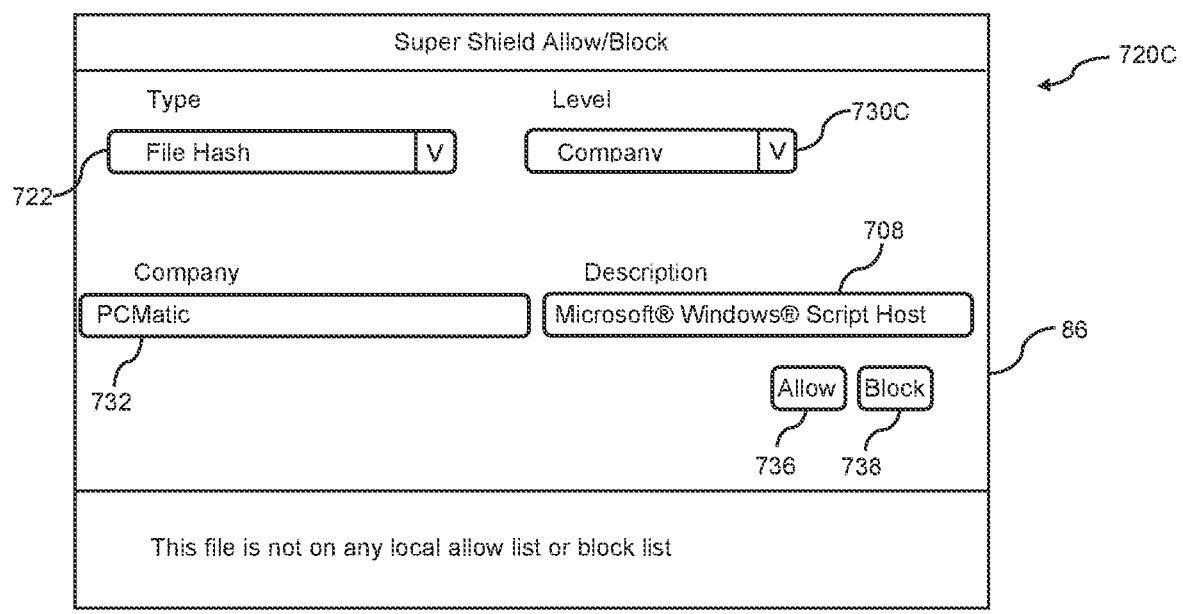

In the example of FIG. 11, an allow user interface 720 is displayed. In this, the user wishes to add a program to the whitelist to allow operation of the program on one or more computers. In FIG. 11, the user has entered (or copied) a hash value for the program into the file hash field 702 and has entered a description 708 of the program. In FIG. 12, the allow user interface with pull-downs 720A is shown indicating that the user has selected "file hash" as the type and other types are noted such as "Digital" and "Signature." The user has selected "Both" as the platform 724 as the platform and other platforms are noted such as "OS-1" and "OS-2" as many enterprises use computers running different operating systems from different suppliers. Once done, the user selects "add," and a new user interface 720B/720C is shown indicating the previously selected type 722 ("File Hash") and allowing the user to select a level 730 such as "account," "company," "group," or "device." Note that "company has been selected as the level 730 and the name of the company 732 is displayed. At this point, the user has the ability to select "allow" 736 to add this program to the whitelists of all computers associated with the selected level 730 (e.g. all computers in the company) or to select "block" 738 to add this program to the whitelists of all computers associated with the selected level 730 (e.g. all computers in the company).

To review and/or adjust the whitelists (or blacklists), a report user interface 740 is used listing a description 742 of each program in the list, a date added 744 for each program in the list, a file hash value 746 for each program in the list, a level 748 for each program in the list, and a type 750 for each program in the list. Note that for each program, there is a "remove' feature 752 that, upon selecting, the associated program will be removed from the list (whitelist or blacklist).

By providing the above noted user interfaces or similar user interfaces, the user (e.g. user of the computer, information technology staff, etc.) is provided the ability to make local or global changes to the whitelists and/or blacklists of their computer or a collection of computers that will allow or block programs having the defined characteristics (e.g. all programs having a certain name, all programs having a certain digital certificate, all programs executing from a specific directory, etc.). As it is known that strict adherence to whitelisting provides a superior level of security, it is desired that using whitelists be palatable by all users. By making whitelisting more convenient and manageable, the users will be more accepting of whitelisting and the users/company will be generally more secure through the protection provided by only allowing execution of programs that are known (e.g., on the whitelist).

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for computer security, the system comprising:
    a target computer having non-transitory storage;
    a whitelist accessible by the target computer, the whitelist containing a list of programs that are approved to run on the target computer;
    a set of rules accessible by the target computer;
    software stored in the non-transitory storage of the target computer, the software runs on the target computer and presents a user interface on the target computer, the software then accepts inputs that configure the set of rules based upon user input and selections;
    when a program attempts to run on the target computer, the software determines whether the program is in the whitelist and when the program is present in the whitelist, the software running on the computer allows the program to run;
    when the program is missing from the whitelist, the software running on the target computer determines whether the program is allowed to run based upon the set of rules and when the software running on the target computer determines that the program is allowed to run based upon one rule of the set of rules, the software running on the target computer runs the program; and when the software running on the target computer determines that the program is blocked based upon the set of rules, the software running on the target computer does not allow execution of the program.

2. The system of claim 1, wherein the user interface provides for creation of a rule based upon a file hash value of the program.

3. The system of claim 1, wherein the user interface provides for creation of a rule based upon a file folder in which the program is stored.

4. The system of claim 1, wherein the user interface provides for creation of a rule based upon a digital signature of the program.

5. The system of claim 1, wherein the user interface provides for creation of a rule that applies only to the target computer.

6. The system of claim 1, wherein the user interface provides for creation of a rule that applies to all computers in a group of computers.

7. The system of claim 1, wherein the user interface provides for creation of a rule that applies to all computers in a user account.

8. The system of claim 1, wherein the user interface provides for creation of a rule that applies to all computers company-wide.

9. A system for computer security, the system comprising:
a target computer having non-transitory storage;
a set of rules accessible by the target computer, the set of rules for determining whether a program is benign;
software stored in the non-transitory storage of the target computer, the software runs on the target computer and presents a user interface on the target computer, the software then accepts inputs that configure the set of rules based upon user input and selections;
the software detects an attempt to run the program on the target computer, the software then determines whether the program conforms to a rule of the set of rules and when the program conforms to the rule, the software running on the computer initiates execution of the program;
when the program does not conform to any rule of the set of rules, the software running on the computer presents a second user interface that describes the program and presents selections for allowing the program to run and when the selections are approved, responses to the selections are recorded into a new rule of the set of rules for approval to allow the program to run the software running on the computer initiates execution of the program; and
when the selections are rejected, software running on the target computer does not allow execution of the program.

10. The system of claim 9, wherein the selections include user interface features that provide for creation of the new rule based upon a file hash value of the program.

11. The system of claim 9, wherein the selections include user interface features that provide for creation of the new rule based upon a file folder in which the program is stored.

12. The system of claim 9, wherein the selections include user interface features that provide for creation of the new rule based upon a digital signature of the program.

13. The system of claim 9, wherein the new rule applies only to the target computer.

14. The system of claim 9, wherein the new rule applies to all computers in a group of computers.

15. The system of claim 9, wherein the new rule applies to all computers in a user account.

16. The system of claim 9, wherein the new rule applies to all computers company-wide.

17. A method of protecting a target computer, the method comprising:
presenting a user interface on the target computer, the user interface accepts inputs that configure a set of rules based upon user input and selections providing the set of rules accessible by the target computer, the set of rules determining if a program is allowed to execute;
upon the program attempting to be run, determining whether the program corresponds to one of the rules and when the program corresponds to any one of the rules, allowing the program to run;
when the program does not correspond to one of the rules, presenting a second user interface on the target computer, the second user interface accepts inputs that configure a new rule based upon user input and the selections;
when the inputs include an approval, running the program; and
when the inputs include a denial, not running the program.

18. The method of claim 17, wherein the new rule applies only to the target computer.

19. The method of claim 17, wherein the new rule applies only to the target computer and other computers and the new rule is distributed to the other computers through a network.

20. The method of claim 19, wherein the other computers comprises all computers associated with a company.

* * * * *